United States Patent
Fauteux et al.

[11] Patent Number: 6,087,045
[45] Date of Patent: Jul. 11, 2000

[54] PRIMER WITH ELECTROCHEMICALLY INERT PARTICULATE AND PROCESS FOR FABRICATING SAME

[75] Inventors: Denis G. Fauteux, Acton; Michael McLin, Wakefield, both of Mass.

[73] Assignee: Mitsubishi Chemical Corporation, Japan

[21] Appl. No.: 09/112,421

[22] Filed: Jul. 9, 1998

Related U.S. Application Data

[60] Provisional application No. 60/062,304, Oct. 17, 1997.
[51] Int. Cl.[7] .................................................. H01M 4/66
[52] U.S. Cl. ...................... 429/245; 429/132; 429/243; 429/244; 29/623.5
[58] Field of Search ........................... 429/132, 243, 429/244, 245; 29/623.5

[56] References Cited

U.S. PATENT DOCUMENTS

| | | | |
|---|---|---|---|
| 5,387,479 | 2/1995 | Koksbang | 429/126 |
| 5,437,941 | 8/1995 | Arledge et al. | 429/129 |
| 5,573,554 | 11/1996 | Fauteux et al. | 429/245 |
| 5,578,396 | 11/1996 | Fauteux et al. | 429/245 |
| 5,580,686 | 12/1996 | Shi et al. | 429/244 |
| 5,588,971 | 12/1996 | Fauteux et al. | 429/245 |
| 5,589,297 | 12/1996 | Koga et al. | 429/245 |
| 5,591,544 | 1/1997 | Fauteux et al. | 429/245 |

*Primary Examiner*—Bruce F. Bell
*Attorney, Agent, or Firm*—Factor & Partners

[57] ABSTRACT

A primer material for use with an electrode. The primer includes a fluid medium and electrochemically inert particulate having a dimensional thickness greater than the dimensional thickness of the fluid medium after the fluid medium is at least partially dried.

14 Claims, 3 Drawing Sheets

PRIMER WITH ELECTROCHEMICALLY INERT PARTICULATE AND PROCESS FOR FABRICATING SAME

This is a continuation of provisional U.S. Application Ser. No. 60/062,304 filed Oct. 17, 1997.

BACKGROUND OF THE INVENTION

1. Field of the Invention

The present invention relates in general to electrodes and electrolytic cells and, their fabrication, and more particularly, to a primer material having electrochemically inert particulate for improving adhesion between the current collecting substrate and an electrode matrix.

2. Background Art

The use of a primer between a current collecting substrate ("current collector") and an electrode matrix material ("electrode matrix") for use in an electrode has been know in the art for several years. Many different types of primers have been used, including conventional primers consisting of carbon-based solutions. It is known that a primer increases adhesion between the current collecting substrate and the electrode matrix material, thus decreasing interfacial resistance between the two layers. Accordingly, the electrical conductivity between the current collector and the electrode matrix material increases, as does the overall capacity and cyclability of the electrolytic cell.

Although conventional primers have worked well, it is always a goal in the art to even further decrease interfacial resistance between the current collector and electrode matrix components of an electrode.

SUMMARY OF THE INVENTION

The present invention is directed to a primer material for use on a current collecting substrate to improve adhesion between the current collecting substrate and an electrode matrix.

In a preferred embodiment of the invention, the primer material comprises a fluid medium mixed together with electrochemically inert particulate, such that the electrochemically inert particles have a particle size which will be greater than the thickness of the primer material after evaporation of the fluid medium.

The present invention is also directed to an electrode comprising a current collecting substrate; a primer material applied to at least a portion of the surface of the current collecting substrate, where the primer material includes a fluid medium, a carbonaceous material and the electrochemically inert particles and wherein at least one electrochemically inert particle has a size greater than the thickness of the primer material; and, an electrode matrix adhered to at least a portion of the primer material wherein at least a portion of the electrode matrix surrounds at least a portion of the electrochemically inert particulate. The electrochemically inert particles are inert relative to at least the fluid medium and the associated electrode matrix.

The present invention also includes a process for fabricating a primer material comprising the steps of a) formulating a fluid medium which will adhere to a current collecting substrate, b) fabricating electrochemically inert particles so that at least one of the particles will have a particle size greater than the thickness of the fluid medium after evaporation and after it is applied to the current collecting substrate, and c) mixing the fluid medium and electrochemically inert particles together.

The present invention further comprises a process for fabricating an electrode for use in an electrolytic cell wherein the electrode is fabricated with the primer having electrochemically inert particles.

BRIEF DESCRIPTION OF THE INVENTION

DETAILED DESCRIPTION OF THE INVENTION

Figure 1A:
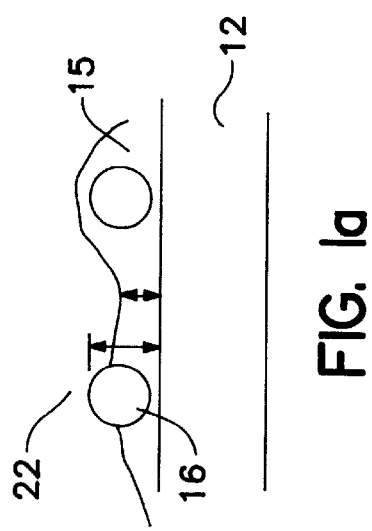
FIG. 1a is an enlarged sectional view of the primer material as applied to a current collecting substrate.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments so illustrated.

Figure 2:
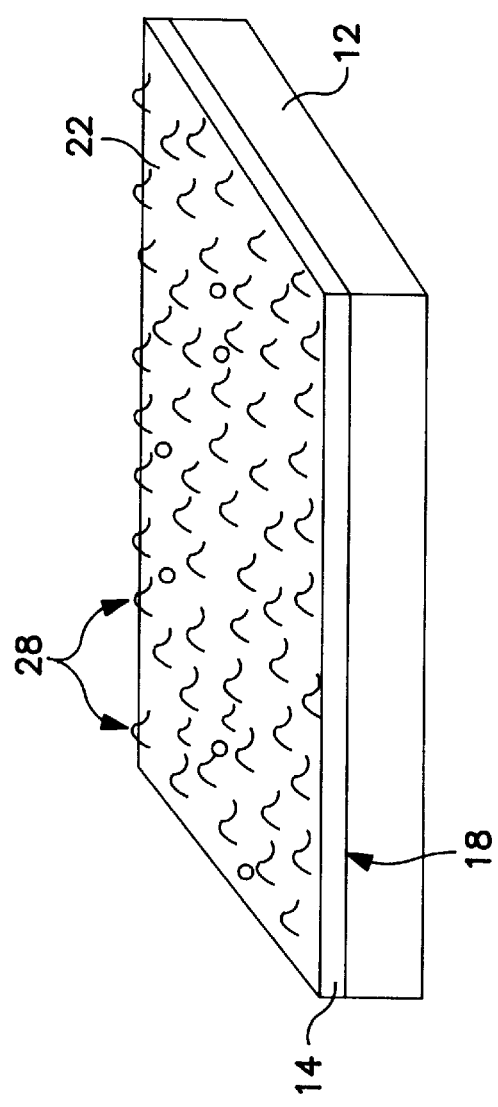
FIG. 2 is a front elevational schematic view of the primer material as applied to a current collecting substrate.
Figure 1:
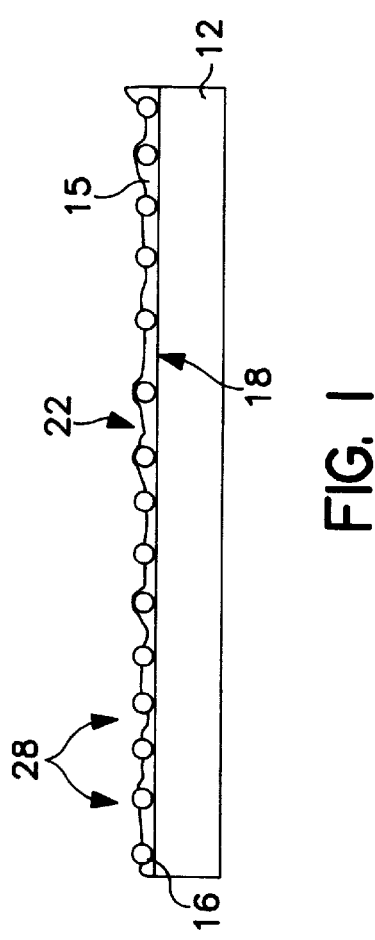
FIG. 1 is an elevated perspective view of the primer material as applied to a current collecting substrate.
Figure 4:
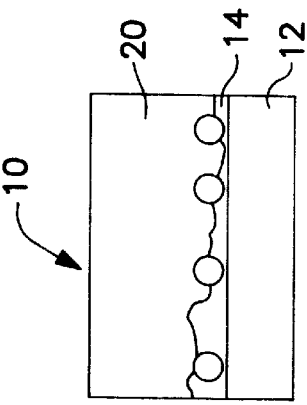
FIG. 4 is a cross-sectional representation of the electrode taken along lines 4—4 of FIG. 3.

Electrode 10 is shown in part (prior to application of an electrode material) in FIG. 1 and 2 as including current collecting substrate 12 and primer material 14. Primer material 14 includes a fluid medium 15 and electrochemically inert particles 16. As will be explained in greater detail with respect to the fabrication process, the fluid medium may include a conventional primer based material such as graphite, lithium polysilicate, carbon black and water, among others. Furthermore, the electrochemically inert particles 16 will be described as glass beads—although other particulate which is electrochemically inert relative to the associated components/compounds of the fully fabricated electrolytic cell, such as pulverized molecular sieves or zeolite of an appropriate dimension, are likewise contemplated for use. In a preferred embodiment of the invention, the glass beads are fabricated from soda-lime glass and may be commercially obtained from Potters Industries Inc., of Valley Forge, Pa. Glass beads are preferred as they have a density comparable to graphite, thus minimizing the settling of the particulate in the fluid medium before it is applied onto the associated current collecting substrate.

Figure 3:
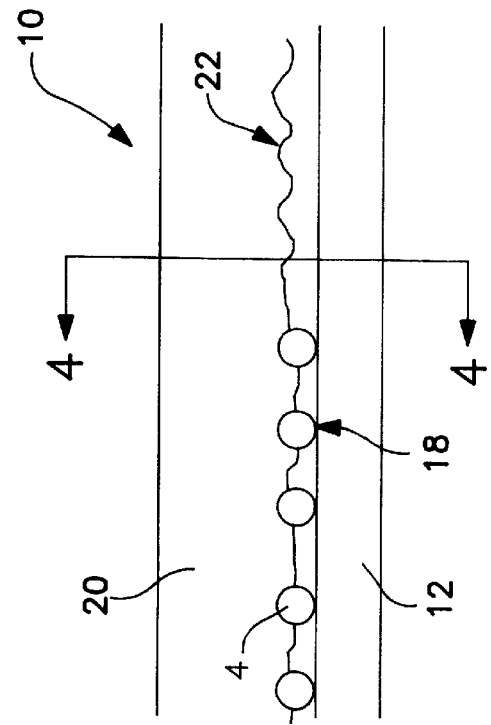
FIG. 3 is a sectional view of the electrode according to the present invention.

Electrode 10, is shown in FIG. 3 as comprising current collecting substrate 12, primer material 14 applied to at least a portion of surface 18 of current collecting substrate 12, and electrode matrix material 20. As can be seen in FIGS. 1 and 2, at least one of electrochemically inert particle 16 has a dimensional thickness "A" (Fig. 1a), which is greater than the dimensional thickness "B" of an adjacent portion of the applied and dried fluid medium 15. Accordingly, such a configuration results in an applied primer material having a surface 22 with a plurality of protrusions 28. However, as can be seen, the electrochemically inert particulate are not necessarily completely covered by fluid medium 15.

Regardless, the particulate has at least a portion covered by the dried the primer and a portion penetrating into electrode matrix 20. (See FIG. 3). Although, electrode matrix 20 may comprise any conventional material, such material, for purposes of the present disclosure only, will be described in greater detail as consisting of lithium cobalt oxide, conductive additives, a plasticizer, acrylate monomers, and a thermal initiator.

The result of using primer 14, with electrochemically inert particulate 16, coat current collecting substrate 12 is increased adhesion between the primer and the electrode matrix material. Accordingly, such an increase in adhesion decreases the interfacial resistance between these two layers, thus optimizing electrical conductivity. This, in turn, results in an electrolytic cell with increased capacity, cyclability, and electrochemical stability as compared to electrodes fabricated with conventional primers.

Although the use of the term electrode has been used, it will be understood to those having ordinary skill in the art that the electrode may comprise an anode or a cathode.

Figure 5:
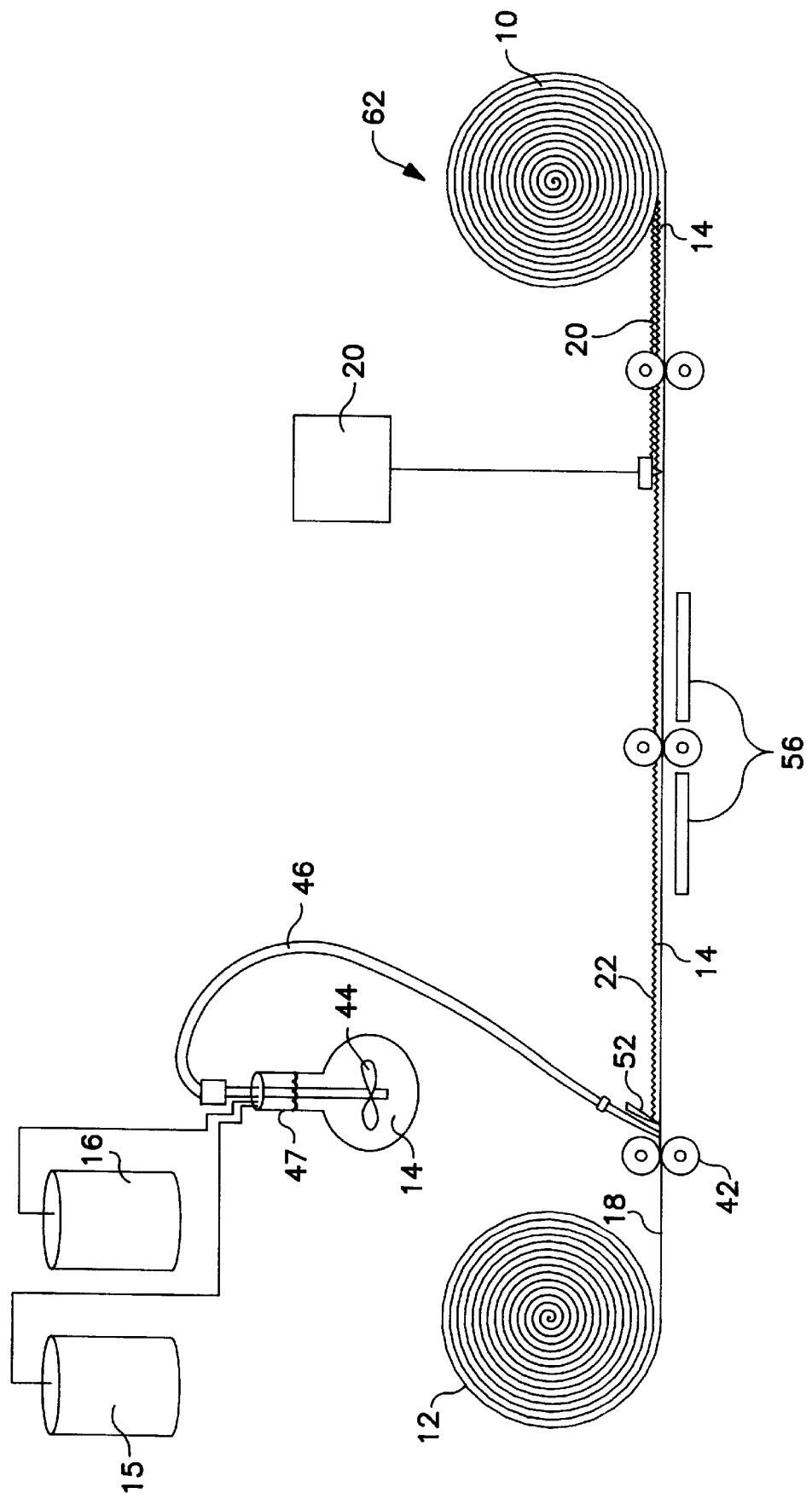
FIG. 5 is schematic diagram of a process for fabricating a primer material and a process for fabricating an electrode for use in an electrolytic cell according to the present invention.

A process for the fabrication of primer 14 and electrode 10 is shown in FIG. 5 as including the steps of formulating fluid medium 15, fabricating electrochemically inert particulate 16 and mixing them together to form the primer 14. In a preferred embodiment, a fluid medium 15 may consist of a dispersed mixture (as will be understood to those having ordinary skill in the art) of KS-6 graphite, XC-72R carbon black, and lithium polysilicate. Dispersion may be accomplished by any number of conventional methods such as by placing ceramic grinding disks into the mixture, placing the mixture and disks into a jar, and then placing the jarred mixture on a ballmill. Alternatively, the fluid medium can be dispersed using grinding equipment, such as 1 mm $ZrO_2$ beads and an attritor or bead mill. Furthermore, it is also contemplated that a surfactant may be used to facilitate dispersion of the carbon components of the fluid medium.

Next, electrochemically inert particulate 16 is fabricated so that the particles will have a particle size which will be greater than the thickness of the fluid medium after the primer material is operatively applied, and then at least partially dried, onto a current collector. Again, electrochemically inert particulate may comprise conventionally available glass beads—although other electrochemically inert particles are also contemplated.

After the fluid medium and the electrochemically inert particles are prepared, the two components are then mixed together to form the fully fabricated primer material 14. The primer material may then be stored for later use, or applied to current collecting substrate 12 toward fabrication of an electrode for use in an electrolytic cell (as shown in FIG. 5 and FIG. 6).

Figure 6:
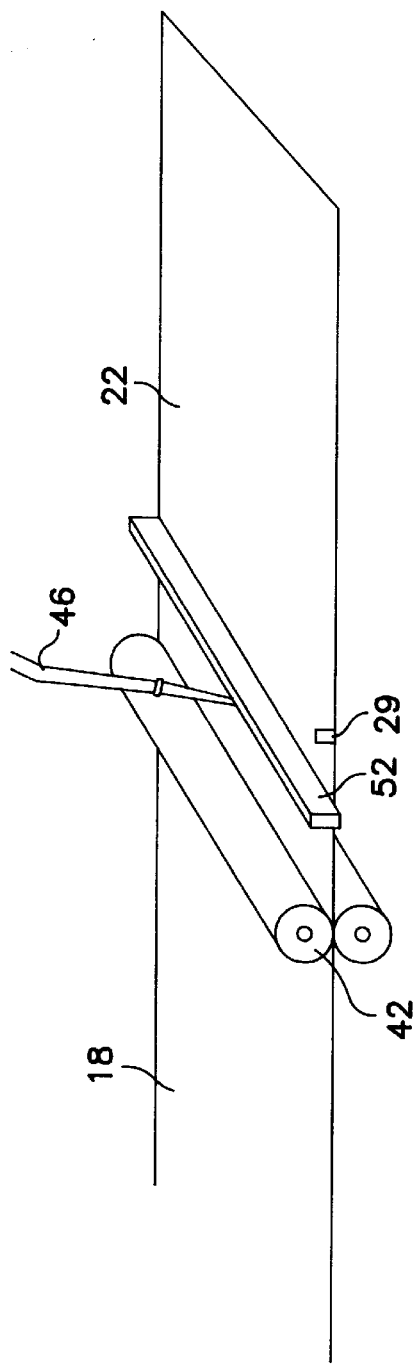
FIG. 6 is an enlarged sectional view of the application of the primer material to the current collecting substrate.

Indeed, as is shown in FIGS. 5 and 6, fully fabricated primer 14 is applied onto surface 18 of a current collecting substrate 12 by any conventional application method. In a preferred embodiment, fully fabricated primer material 14 is pumped from holding vessel 47, through pump hose 46 and onto surface 18 of current collecting substrate 12. As can be seen in FIG. 6, the primer may be applied directly onto the current collector, either before or after contact of the current collector with roller 42, or, the primer may be applied onto the roller wherein it will then be roll coated onto the surface of the current collector.

As seen in FIG. 5, holding vessel 47 includes mixer 44. The mixer serves to keep primer material 14 well agitated, and, in turn, more consistent in composition when pumped out of the vessel and onto the current collector substrate.

After the primer material is applied to surface 18 of current collecting substrate 12, the combination passes under distribution bar 52. The distribution bar 52 spans the width of the current collecting substrate and is positioned slightly above the current collector surface. The distribution bar serves to uniformly spread the primer material over the surface of the current collecting substrate. Once operatively applied, the primed surface will have a plurality of protrusions 28 (See FIGS. 1 and 2) as a result of the electrochemically inert particulate 16, in the primer, having a thickness greater than the thickness of applied primer devoid of the inert particulate, or with thinner particulate. This relationship between the applied electrochemically inert particulate and fluid medium, in turn, results in a primer surface 29 having an operatively controlled range of thickness.

Once primer 12 is operatively applied to surface 18 of current collector substrate 12, the primer coating is then at least partially dried. In a preferred embodiment, such drying is accomplished by advancing the primed current collector over metal hot plate 56, which may be heated to 300° C. to evaporate the volatile portion of the applied primer. Of course, other conventional heating methods are likewise contemplated for use. For instance, it is contemplated that the primer be thermally cured by positioning the underlying current collecting substrate and primer material through an oven for the requisite curing/drying period.

After subjecting the primed current collector to the hot plate, it then travels over an unheated portion of the coating line and is allowed to cool, before it is eventually rolled onto core take-up reel 62. Finally, the roll of primed current collector is treated in a high temperature oven at 385° C. for two hours.

At this point in the process, the roll of material may be stored or used for association with additional manufacturing processes, for example the fabrication of an electrode. Alternatively, and as is preferred by the present invention, after operative drying of the primer coat, an electrode matrix material 20 (FIG. 5) is then applied to at least a portion of primed surface 29. The application of the electrode/matrix to the primer may be accomplished in any number of conventionally known processes.

Next, the electrode matrix material is thermally cured (as that term will be understood to those having ordinary skill in the art and having the present specification before them). Because the applied primer material 14 has an operatively controlled range of thickness with electrochemically inert particles protruding like bumps from the cured fluid medium coating, at least a portion of the electrode matrix 20 surrounds the protruding bumps 28 (See FIG. 3). This relationship enhances the adhesion between the electrode matrix and the surface of the primer material, thus decreasing interfacial resistance therebetween. This decrease in interfacial resistance, in turn, results in an electrode with increased electronic conductivity.

After the electrode matrix is operatively adhered to the surface of the primer material, the formed electrode 10 may then be collected on take-up reel 62. Electrode 10 may then be stored or used in additional manufacturing processes, such as association with an electrolyte in the fabrication of an electrolytic cell.

In support of the increased adhesion between the electrode matrix and the primer material, as compared to when conventional primers are used, two tests were conducted. In a first test, an Aluminum current collector 4.0 inches wide with a thickness of 25 microns was primed with a conventional polysilicate and graphite mixture. The primer coating was dripped onto the current collector and then passed under a #20 Mayer rod at a web speed of 4 ft/min to establish the thickness of the primer coat. The primed Aluminum current collector was then passed over a 4 foot metal surface heated to 300° C. to evaporate the volatile portion of the primer. Next, the primed current collector was allowed to cool before being rolled up into a core and treated in a high temperature oven at 385° C. for two hours. The resultant composition of the dried primer layer comprised 62% wt Timcal KS-6 Graphite Carbon and 38% wt Lithium Polysilicate.

An electrode matrix was then applied to the primed current collector. The electrode matrix comprised a cathode paste containing 70% wt $LiCoO_2$, 5% wt electronically conductive additives, 21.9% wt plasticizer (propylene carbonate), 3.1% wt. acrylate monomers, 0.77% wt polyethylene oxide and 0.1% wt. thermal initiator. The thickness of the matrix was measured to be 175 microns. After the electrode matrix was operatively applied to the primed current collector, it was then thermally cured at 100° C. for 10 minutes.

Next, the above fabricated electrode was cut into two pieces—each piece having a dimension of 42×60 $mm^2$. A polymer electrolyte layer with a thickness of approximately 50 microns was then applied onto the surface of each of the electrodes. The two electrodes were then connected, separated by a polypropylene film mask with a thickness of 25 microns and containing an opening of 40×50 $mm^2$. Finally, two Al tabs were spot welded on each of the electrodes and vacuum sealed in an aluminized polypropylene bag, thus leaving two edges of the Al tabs outside of the bag for electric connection.

The electrolytic cell was measured on a Solatron FRA 1250/ECI 1286 in a frequency range of 60 KHz to 1 Hz. The cell displayed a total internal resistance of 4.8 ohms.

A second test was then performed using the same procedures as test 1, except that the composition of the primer material was changed in accordance with the teachings of the present invention. Specifically, the primer comprised 8.8% wt. of 6 micron Graphite Carbon (Timcal KS-6), 29.3% wt. of 20% solution of Lithium Polysilicate (Aldrich), 2.7% wt. 35 micron soda-lime glass beads (Potter Industries Inc.), and 0.9% wt. XC-72R carbon black, 57.9% wt. distilled water, and 0.4% wt. of a TX-100 wetting agent. The primer was applied onto the Al current collector and then dried. After drying, the final composition of the primer layer comprised 45% wt. KS-6 graphite, 5% wt. XC-72R carbon black, 14% wt. glass beads, and 36% wt. lithium polysilicate.

The previously described electrode matrix, electrolyte film mask and aluminum tabs were operatively associated so as to form an electrolytic cell similar to that in Test 1 (other than with respect to the primer composition). The electrolytic cell was then measured using the same procedures as set out above for Test 1. Based upon such testing, the cell exhibited a total internal resistance of only 1.3 ohms. Accordingly, the results of these two tests confirmed that the total internal resistance of an electrolytic cell using the primer material as disclosed by the present invention is considerably lower than the total internal resistance of an electrolytic cell using conventional primer technology.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A primer material for application onto a current collecting substrate of an electrode in an electrolytic cell, the primer material comprising:
    a fluid medium; and
    electrochemically inert particulate mixed with the fluid medium, wherein at least one of the particles of the electrochemically inert particulate has a particle size which will be greater than the thickness of the fluid medium after the primer material is applied onto the current collector and after the fluid medium is at least partially dried.

2. The primer material according to claim 1, wherein the electrochemically inert particulate comprises one of glass beads, pulverized molecular sieves or zeolite of an appropriate dimension.

3. The primer material according to claim 1, wherein the fluid medium comprises a carbonaceous material.

4. An electrode for use in an electrolytic cell, the electrode comprising:
    a current collecting substrate having a surface;
    a primer material applied to at least a portion of the surface of the current collecting substrate, wherein the primer material includes,
        a fluid medium having a thickness, and
        electrochemically inert particles, relative to at least the fluid medium and an associable electrode matrix, wherein at least one of the electrochemically inert particles has a size which is greater than the thickness of the fluid medium after the fluid medium is at least partially dried; and
    an electrode matrix adhered to at least a portion of the primer material, wherein at least a portion of the electrode matrix surrounds at least a portion of the electrochemically inert particles which have a size greater than the thickness of the at least partially dried fluid medium.

5. The electrode according to claim 4 wherein the electrochemically inert particulate comprises one of glass beads, pulverized molecular sieves or zeolite of an appropriate dimension.

6. The electrode according to claim 4 wherein the fluid medium comprises a carbonaceous material.

7. The invention according to claim 4 wherein the electrode comprises at least one of a cathode and an anode.

8. A process for fabricating a primer material comprising the steps of:
    formulating a fluid medium which will adhere to a current collecting substrate;
    fabricating electrochemically inert particulate so that at least one of the particles will have a particulate size which will be greater than the thickness of the fluid medium after the fully fabricated primer material has been applied to the current collecting substrate; and
    mixing the electrochemically inert particulate with the fluid medium.

9. The process according to claim 8, wherein the electrochemically inert particulate comprises one of glass beads, pulverized molecular sieves or zeolite of an appropriate dimension.

10. The process according to claim 8, wherein the fluid medium comprises a carbonaceous material.

11. A process for fabricating an electrode for use in an electrolytic cell comprising the steps of:
    applying a primer material onto at least a portion of a surface of a current collecting substrate wherein the primer material as applied has at least one electrochemically inert particulate that has a size greater than the thickness of the applied fluid medium, after the fluid medium is at least partially dried to, in turn, result in a primer surface having an controlled range of thickness; and applying and adhering an electrode matrix to at least a portion of the primer surface, wherein at least a portion of the electrode matrix surrounds at least a portion of the electrochemically inert particulate, to enhance adhering therebetween, and, in turn, decrease interfacial resistance therebetween.

12. The process according to claim 11, further including the step of agitating the primer material prior to the step of applying the primer material.

13. The process according to claim 11, wherein the electrochemically inert particulate comprises one of glass beads, pulverized molecular sieves or zeolite of an appropriate dimension.

14. The process according to claim 11, wherein the primer material includes a carbonaceous fluid.

* * * * *